United States Patent
Kuwana et al.

(10) Patent No.: US 7,547,119 B2
(45) Date of Patent: Jun. 16, 2009

(54) TOUCH SENSOR OPERATED VEHICLE ROOM LAMP TO BE TURNED ON AND OFF

(75) Inventors: Isamu Kuwana, Kawagoe (JP); Hirofumi Okano, Kawagoe (JP)

(73) Assignee: Kabushiki Kaisha T An T, Kawagoe-Shi, Saitama Prefecture (JP)

( * ) Notice: Subject to any disclaimer, the term of this patent is extended or adjusted under 35 U.S.C. 154(b) by 67 days.

(21) Appl. No.: 11/405,499

(22) Filed: Apr. 18, 2006

(65) Prior Publication Data
US 2006/0245200 A1    Nov. 2, 2006

(30) Foreign Application Priority Data
Apr. 28, 2005    (JP)    ............... 2005-132640

(51) Int. Cl.
*F21V 29/00*    (2006.01)

(52) U.S. Cl. ............ 362/294; 362/147; 362/276; 362/488; 362/490; 200/310; 200/312; 200/313; 200/314; 200/317

(58) Field of Classification Search ............ 362/147, 362/276, 438, 488, 490, 489, 493, 95, 652; 200/310, 312, 313, 314, 317
See application file for complete search history.

(56) References Cited

U.S. PATENT DOCUMENTS

| 5,434,757 | A  | * | 7/1995  | Kashiwagi    | 362/501 |
| 7,084,531 | B2 | * | 8/2006  | Bruwer       | 307/140 |
| 7,207,686 | B2 | * | 4/2007  | Schmidt et al. | 362/26 |
| 2001/0030871 | A1 | * | 10/2001 | Anderson et al. | 362/488 |
| 2001/0032655 | A1 | * | 10/2001 | Gindi         | 132/293 |
| 2003/0159910 | A1 | * | 8/2003  | Caldwell      | 200/310 |
| 2004/0119484 | A1 | * | 6/2004  | Basir et al.  | 324/680 |
| 2004/0165118 | A1 | * | 8/2004  | Huber         | 348/789 |
| 2004/0227409 | A1 | * | 11/2004 | Bruwer        | 307/141 |
| 2004/0227625 | A1 | * | 11/2004 | Joehl et al.  | 340/438 |
| 2004/0238340 | A1 | * | 12/2004 | Bick et al.   | 200/402 |
| 2006/0050018 | A1 | * | 3/2006  | Hutzel et al. | 345/60  |

FOREIGN PATENT DOCUMENTS

DE    102005040853 A1 *    3/2007
JP    2002-172977            6/2002

* cited by examiner

*Primary Examiner*—Sharon E Payne
*Assistant Examiner*—Mary Zettl
(74) *Attorney, Agent, or Firm*—Nixon & Vanderhye P.C.

(57) ABSTRACT

A vehicle interior light system includes a lamp, an enclosure internally provided with the lamp, a lens attached to the front of the enclosure, a touch sensor arranged on the back surface of the lens, and a control circuit including a sensor circuit and a switching circuit. The sensor circuit is configured to detect the capacitance of a human body when the lens is touched or approached by a finger or the like. The switching circuit is configured to turn the lamp on and off in response to an output from the sensor circuit.

10 Claims, 4 Drawing Sheets

TOUCH SENSOR OPERATED VEHICLE
ROOM LAMP TO BE TURNED ON AND OFF

BACKGROUND OF THE INVENTION

1. Field of the Invention

The present invention relates to a vehicle interior light system to be mounted on the interior roof of a vehicle, and particularly to a vehicle interior light system capable of turning an interior lamp on and off when the tip of a finger or the like approaches a touch sensor provided on a lens.

2. Description of the Related Art

Typical known vehicle interior light systems have a slide switch or a push-button switch on an enclosure so that a lamp inside the light system can be turned on and off by sliding the slide switch or pressing the push-button switch. Since such a vehicle interior light system has a switch on the enclosure, the size of a lens used in the light system is small relative to the size of the enclosure. This is disadvantageous in that the illuminated area is small.

To solve such a problem, the present applicant developed an interior light system for vehicles as disclosed in Japanese Unexamined Patent Application Publication No. 2002-172977. This interior light system has a lens which is rotatably attached to an enclosure of an interior lamp such that pressing the lens allows an internal push-button switch to be turned on and off, thereby turning the interior lamp on and off. In this case, since the lens itself serves as a control member for controlling the push-button switch, the lens can be arranged to cover the entire opening of the enclosure. This not only increases the size of the lens and thus increases the brightness of illumination, but also contributes to the improved design of the interior light system.

In the interior light system for vehicles described above, it is possible that the internal push-button switch interferes with the transmission of light near the light source, blocks the light from uniformly illuminating the entire surface of the lens, and thus lowers the overall brightness of illumination. Moreover, since the interior light system has a mechanism that allows the lens to rotate, the service life of the system may be shortened due to wear resulting from the rotation of the lens.

SUMMARY OF THE INVENTION

The present invention has been made in view of the problems described above. An object of the present invention is to provide a vehicle interior light system that has a small touch sensor on the back surface of a lens such that a lamp can be turned on and off when the lens is touched or approached by a finger or the like, achieves a high level of brightness by substantially uniformly illuminating the entire surface of the lens with the lamp in a state where there is virtually no interference, eliminates the need for some mechanical structures, requires no mechanical switch, and thus has a long service life.

According to a first aspect of the present invention, a vehicle interior light system includes a lamp, an enclosure internally provided with the lamp, a lens attached to the front of the enclosure, a touch sensor arranged on the back surface of the lens, and a control circuit including a sensor circuit and a switching circuit. The sensor circuit is configured to detect the capacitance of a human body when the lens is touched or approached by a finger or the like. The switching circuit is configured to turn the lamp on and off in response to an output from the sensor circuit.

According to a second aspect of the present invention, in the first aspect, the touch sensor is affixed to the back surface of the lens. According to a third aspect of the present invention, in the first aspect, the touch sensor is positioned near the back surface of the lens and is vertically arranged on the same substrate as that on which the control circuit is mounted.

According to a fourth aspect of the present invention, the vehicle interior light system of any one of the first to third aspects further includes an auxiliary lamp mounted on the control circuit and configured to project a spot of light onto the lens so as to indicate the position of the touch sensor.

According to a fifth aspect of the present invention, in the first aspect, a marker for indicating the position of the touch sensor is formed on the surface of the lens. According to a sixth aspect of the present invention, in the first aspect, the lamp is a light-emitting diode. According to a seventh aspect of the present invention, in the first aspect, the lens is configured to cover substantially the entire surface of the enclosure.

In the above-described vehicle interior light system of the present invention, since the lamp can be turned on and off by bringing a finger or the like close to the touch sensor on the back surface of the lens, some known mechanical parts and a mechanical switch become no longer needed. This not only allows the prevention of failures caused by mechanical wear, but also increases the level of brightness through the lens, as the transmission of light from the lamp is obstructed only by the small touch sensor.

Moreover, since the touch sensor is affixed to the back surface of the lens, or is vertically arranged on the substrate and positioned on the back surface of the lens, it is possible to provide a vehicle interior light system that is simple in structure, free from failures, and inexpensive.

Moreover, when the vehicle interior light system is configured such that the touch sensor is illuminated from behind, the position of the touch sensor can be easily identified even in the dark, such as at night, and the lamp can be easily and reliably turned on. When a marker for indicating the position of the touch sensor is formed on the surface of the lens, the position of the touch sensor can be identified at a glance under bright conditions, such as in the daytime.

Moreover, using a light-emitting diode (such as a white light-emitting diode) as the lamp not only allows power savings, but also ensures safe turning-off operation since the lens is not heated by the light-emitting diode, which generates only a small amount of heat. Moreover, the lens covering the entire opening of the enclosure not only allows the lamp to illuminate a large area and to produce a high level of brightness, but also provides a good appearance.

DESCRIPTION OF THE PREFERRED EMBODIMENTS

The present invention provides a vehicle interior light system that allows a lamp to be turned on and off when a lens with a touch sensor on its back surface is touched or approached by a finger or the like.

First Embodiment

Figure 1:
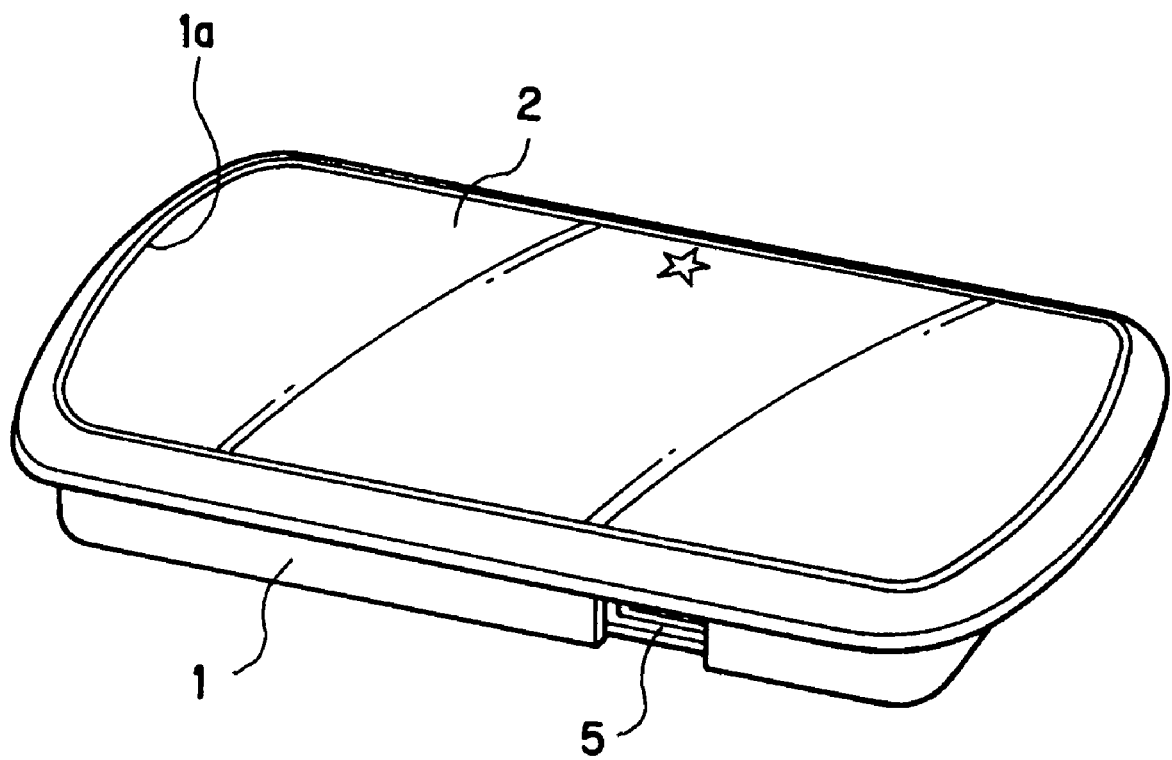
FIG. 1 is a perspective view showing a vehicle interior light system according to a first embodiment of the present invention.
Figure 2:
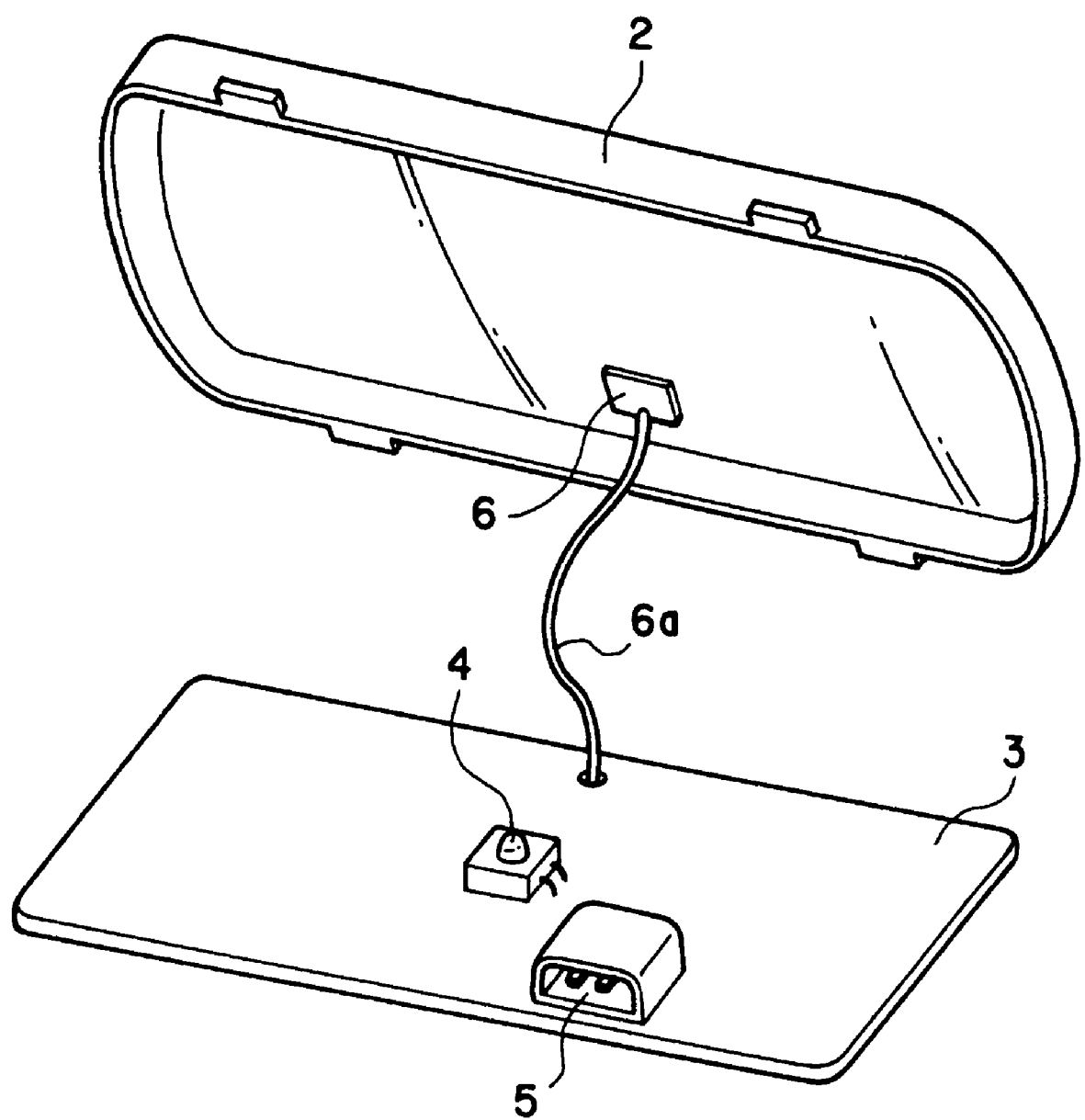
FIG. 2 is an exploded perspective view showing the same system as in FIG. 1 except that an enclosure is not shown here.

A vehicle interior light system according to the first embodiment of the present invention will now be described with reference to FIG. 1 and FIG. 2.

A lens 2 is disposed over an opening 1a of an enclosure 1 to cover substantially the entire surface of the enclosure 1. A substrate 3 (shown in FIG. 2) is secured internally to the enclosure 1. A lamp 4, such as a white light-emitting diode, and a connector 5 for connection to a power source are soldered to the substrate 3. A touch sensor 6 made of a conductive member or a semiconductive member, such as a metal plate or an aluminum foil, is affixed to the back surface of the lens 2 and is connected via a lead 6a to a control circuit (not shown) mounted on the substrate 3. The control circuit includes a sensor circuit and a switching circuit. The sensor circuit detects a change in capacitance when a human body touches or approaches the lens 2 provided with the touch sensor 6 on the back surface thereof. The switching circuit allows the lamp 4 to be turned on and off in response to an output from the sensor circuit. A marker 2a indicates the position at which the touch sensor 6 is affixed to the lens 2.

The vehicle interior light system configured as described above is attached to the interior roof of a vehicle while being connected via the connector 5 to the power source. To turn the lamp 4 on in the dark, such as at night, the user touches the marker 2a of the lens 2 with a finger or the like or brings a finger or the like close to the marker 2a. This changes the capacitance of the touch sensor 6. The control circuit detects this capacitance change and turns the lamp 4 on. To turn the lamp 4 off, the user similarly touches the marker 2a with a finger or the like or brings a finger or the like close to the marker 2a. Upon detection of this, the control circuit turns the lamp 4 off.

Second Embodiment

Figure 3:
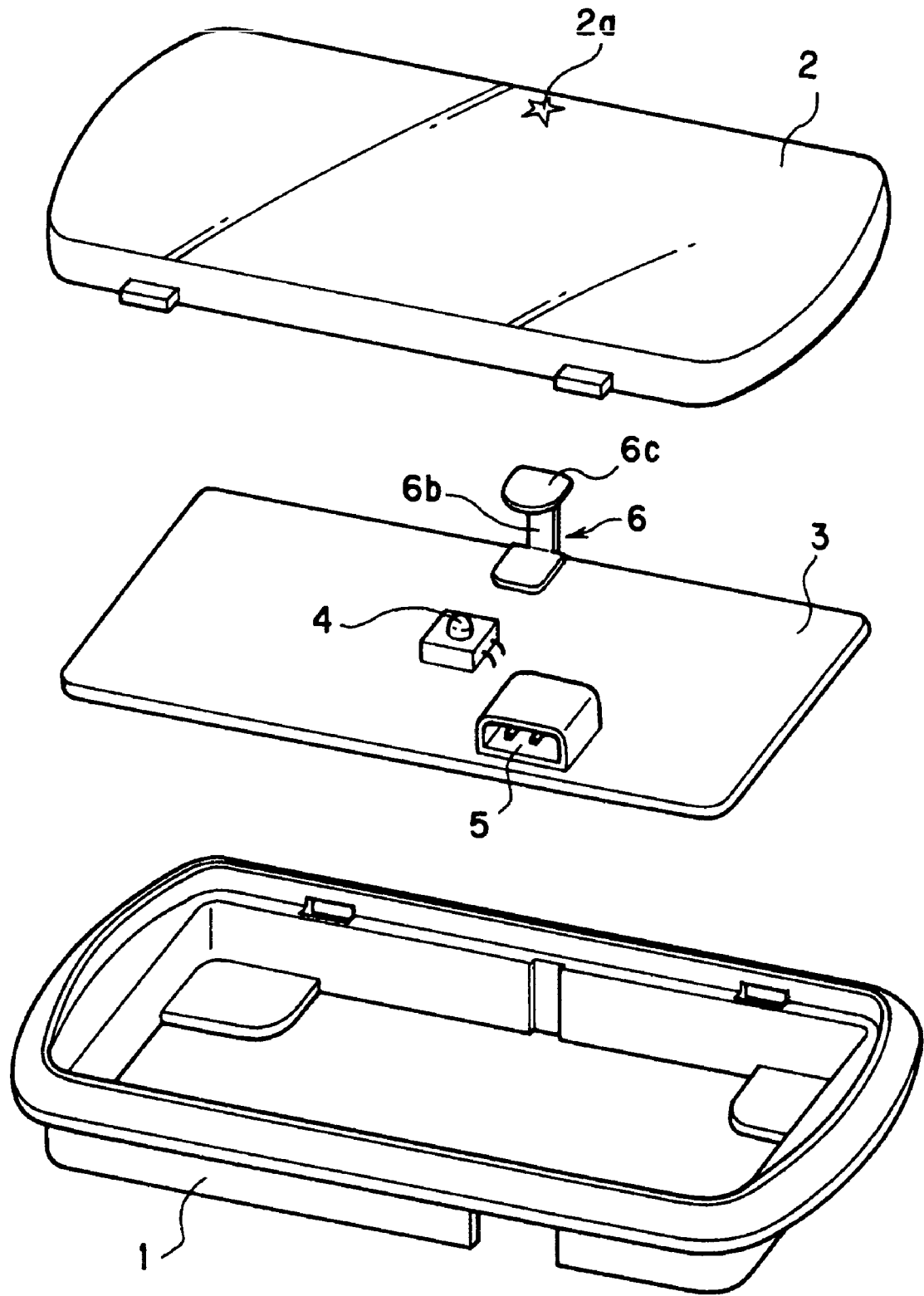
FIG. 3 is an exploded perspective view showing the entire vehicle interior light system according to a second embodiment of the present invention.

The second embodiment will now be described with reference to FIG. 3. The same reference numerals as those in the first embodiment denote the same or corresponding members and the descriptions thereof will be omitted here.

In the second embodiment, the touch sensor 6 connected to the control circuit is made of a conductive member, such as a metal plate, and is soldered to the substrate 3 at one end. A support post 6b of the touch sensor 6 extends vertically from the substrate 3 and is attached to a contact part 6c at the other end of the touch sensor 6. The contact part 6c is in close contact with the back surface of the lens 2 or is arranged near the back surface of the lens 2.

In the vehicle interior light system of the second embodiment configured as described above, the contact part 6c of the touch sensor 6 is in contact with or close to the back surface of the lens 2. Therefore, when a human finger touches or approaches the marker 2a of the lens 2, the control circuit detects the resulting change in capacitance and turns the lamp 4 on and off in a similar manner to that of the first embodiment.

Third Embodiment

Figure 4:
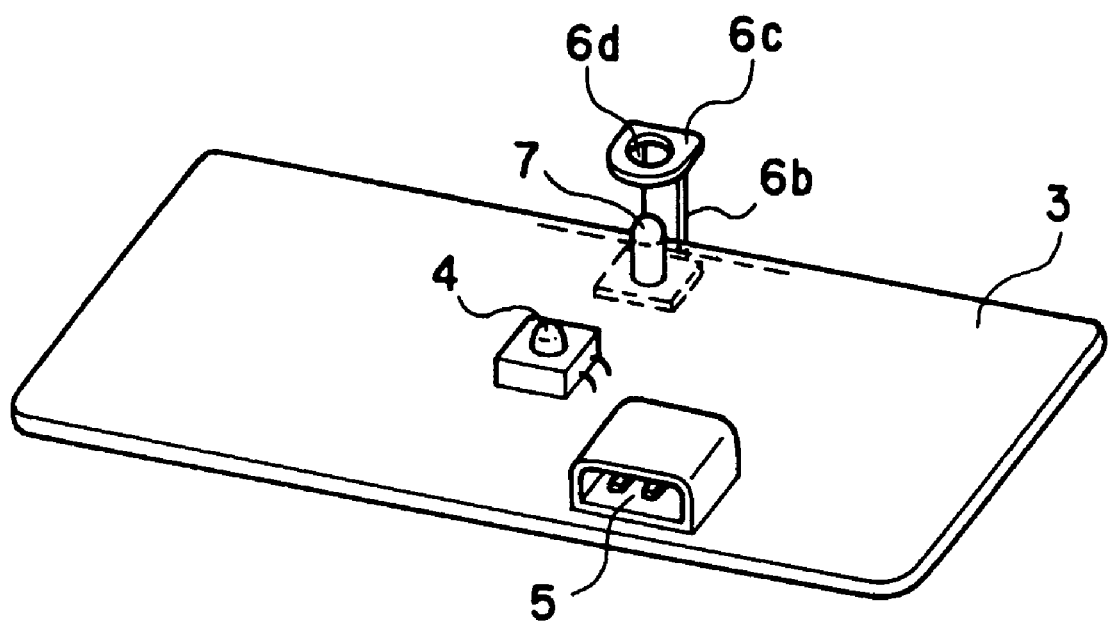
FIG. 4 is a perspective view showing a substrate portion of a vehicle interior light system according to a third embodiment of the present invention.

The third embodiment will now be described with reference to FIG. 4. The same reference numerals as those in the second embodiment denote the same or corresponding members and the descriptions thereof will be omitted here.

In the third embodiment, the contact part 6c of the touch sensor 6 is provided with a hole 6d for use in illumination, while an auxiliary lamp (light-emitting diode) 7 for indicating the position of the touch sensor 6 is disposed immediately below the hole 6d and soldered to the substrate 3.

The vehicle interior light system of the third embodiment described above is configured such that the auxiliary lamp 7 is ON while headlights are ON for night driving or the like. Therefore, light emitted from the auxiliary lamp 7 is projected onto the surface of the lens 2 through the hole 6d when it is dark inside the vehicle, for example, at night. This allows the position of the touch sensor 6 to be immediately identified and thus the lamp 4 to be reliably turned on.

What is claimed is:

1. A vehicle interior light system for illuminating an interior space of a vehicle, the light system comprising:
    an enclosure defining an internal space and a front opening;
    a rear substrate connected to the enclosure within the internal space thereof, the rear substrate being opposed to and spaced from the front opening;
    a lamp connected to the rear substrate of the enclosure so as to emit a visible light toward the front opening;
    a lens attached to the front opening of the enclosure so as to cover the front opening and the lamp within the enclosure so as to allow emitted light from the lamp to illuminate the interior space of the vehicle, the lens having a back surface which faces inwardly toward the substrate within the internal space of the enclosure, and a front surface which faces outwardly toward the interior space of the vehicle;
    a touch sensor positioned within the internal space of the enclosure at a sensor location in contact with or closely adjacent to the back surface of the lens so as to establish a sensor region on the front surface of the lens opposite to the sensor location;
    a control circuit fixed to the rear substrate of the enclosure; and
    an electrical conductor establishing electrical connection between the touch sensor and the control circuit, wherein
    the control circuit includes:
        a sensor circuit configured to detect the capacitance of a human body when the front surface of the lens is touched or approached by a finger or the like at the sensor region and responsively generating an output in response thereto; and
        a switching circuit configured to turn the lamp on and off in response to receiving the output from the sensor circuit, and wherein
        the electrical conductor comprises an electrically conductive support post for electrically connecting the touch sensor and the control circuit, the support post having one end attached to the rear substrate and having an opposite end attached to the touch sensor so as to support the touch sensor in vertically spaced relationship to the rear substrate.

2. The vehicle interior light system according to claim 1, wherein the touch sensor is positioned near the back surface of the lens within the internal space of the enclosure.

3. The vehicle interior light system according to claim 2, further comprising an auxiliary lamp mounted on the control circuit and configured to project a spot of light onto the back surface of the lens so as to indicate the location of the sensor region on the front surface of the lens.

4. The vehicle interior light system according to claim 1, further comprising an auxiliary lamp mounted on the control circuit and configured to project a spot of light onto the back surface of the lens so as to indicate the location of the sensor region on the front surface of the lens.

5. The vehicle interior light system according to claim 1, wherein the front surface of the lens comprises a marker for indicating the location of the sensor region on the front surface of the lens.

6. The vehicle interior light system according to claim 5, further comprising an auxiliary lamp mounted on the control circuit and configured to project a spot of light onto the lens so as to indicate the location of the sensor region on the front surface of the lens.

7. The vehicle interior light system according to claim 1, wherein the lamp is a light-emitting diode.

8. The vehicle interior light system according to claim 1, wherein the lens covers the front opening over substantially the entire surface of the enclosure.

9. The vehicle interior light system according to claim 1, wherein the touch sensor defines a hole therethrough, and wherein the control circuit comprises an auxiliary lamp which projects a spot light through the hole and onto the back surface of the lens so as to indicate the sensor location on the front of the lens.

10. A vehicle interior light system for illuminating an interior space of a vehicle, the light system comprising:
   an enclosure defining an internal space and a front opening;
   a rear substrate connected to the enclosure within the internal space thereof, the rear substrate being opposed to and spaced from the front opening;
   a lamp connected to the rear substrate of the enclosure so as to emit a visible light toward the front opening;
   a lens attached to the front opening of the enclosure so as to cover the front opening and the lamp within the enclosure so as to allow emitted light from the lamp to illuminate the interior space of the vehicle, the lens having a back surface which faces inwardly toward the substrate within the internal space of the enclosure, and a front surface which faces outwardly toward the interior space of the vehicle;
   a touch sensor which defines a hole therethrough and is positioned within the interior space of the enclosure at a sensor location in contact with or closely adjacent to the back surface of the lens so as to establish a sensor region on the front surface of the lens opposite to the sensor location;
   a control circuit fixed to the rear substrate of the enclosure;
   an electrical conductor establishing electrical connection between the touch sensor on the lens and the control circuit on the rear substrate; and
   an auxiliary lamp mounted on the control circuit and configured to project a spot of light through the hole in the touch sensor onto the back surface of the lens so as to indicate the location of the sensor region on the front surface of the lens, and wherein
   the control circuit includes:
      a sensor circuit configured to detect the capacitance of a human body when the front surface of the lens is touched or approached by a finger or the like at the sensor region and responsively generating an output in response thereto; and
      a switching circuit configured to turn the lamp on and off in response to receiving the output from the sensor circuit, and wherein
   the electrical conductor comprises an electrically conductive support post for electrically connecting the touch sensor and the control circuit, the support post having one end attached to the rear substrate and having an opposite end attached to the touch sensor so as to support the touch sensor in vertically spaced relationship to the rear substrate.

* * * * *